Dec. 7, 1954          A. D. SINDEN          2,696,312
APPARATUS FOR UNLOADING BULK MATERIAL FROM BOXCARS
Filed April 1, 1949          9 Sheets-Sheet 2
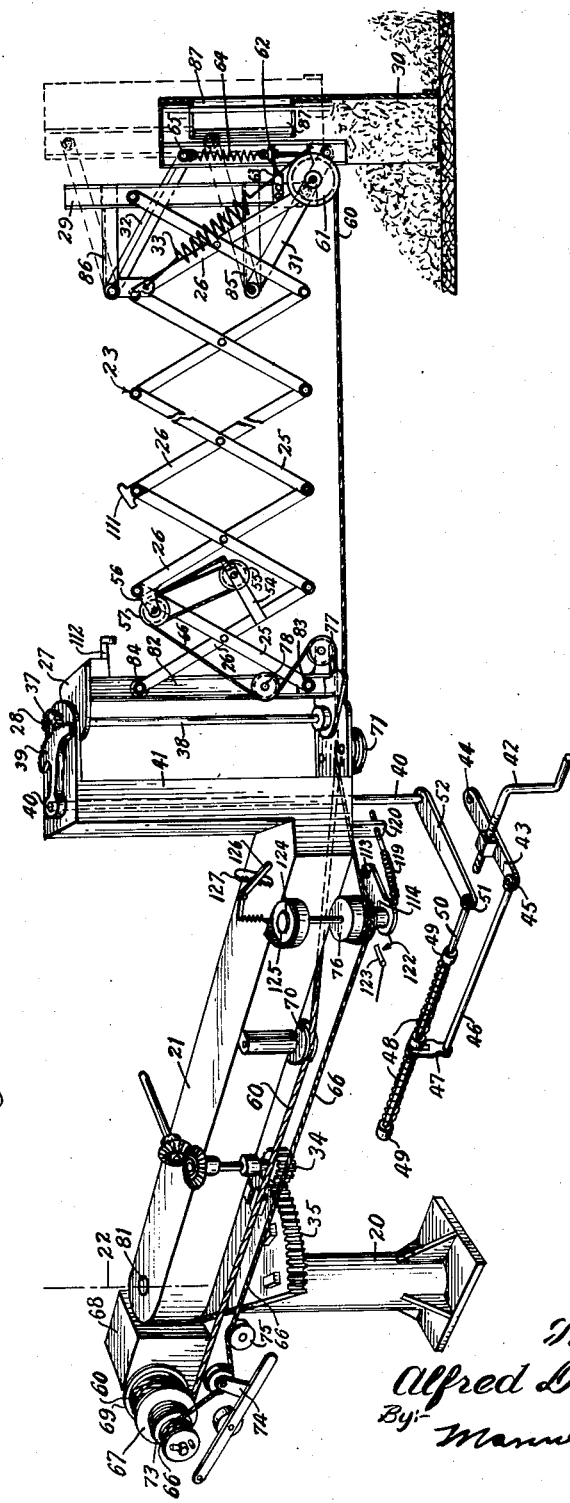

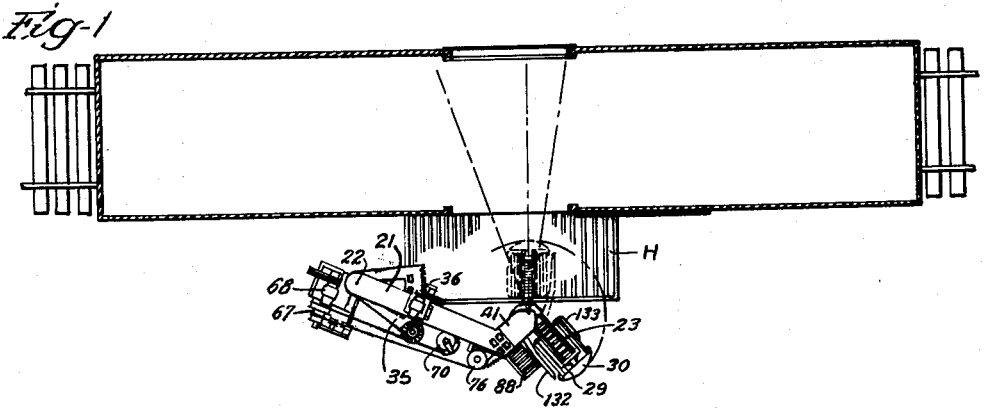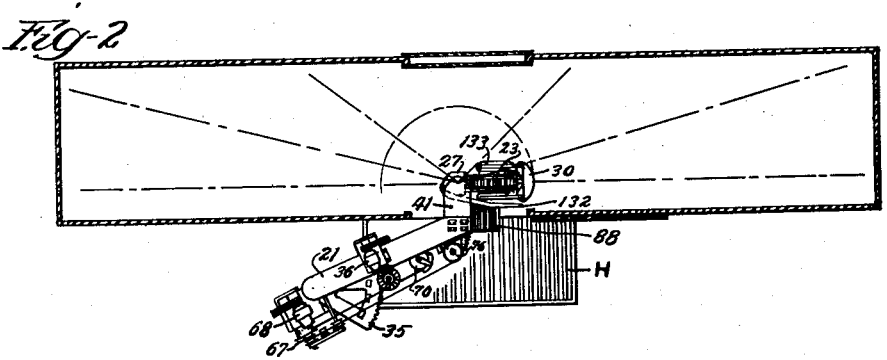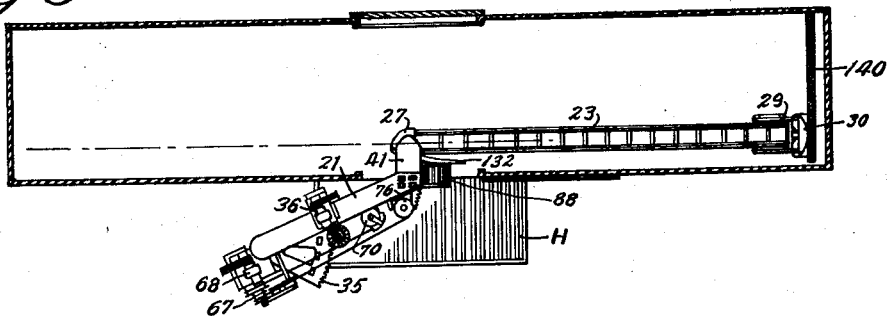

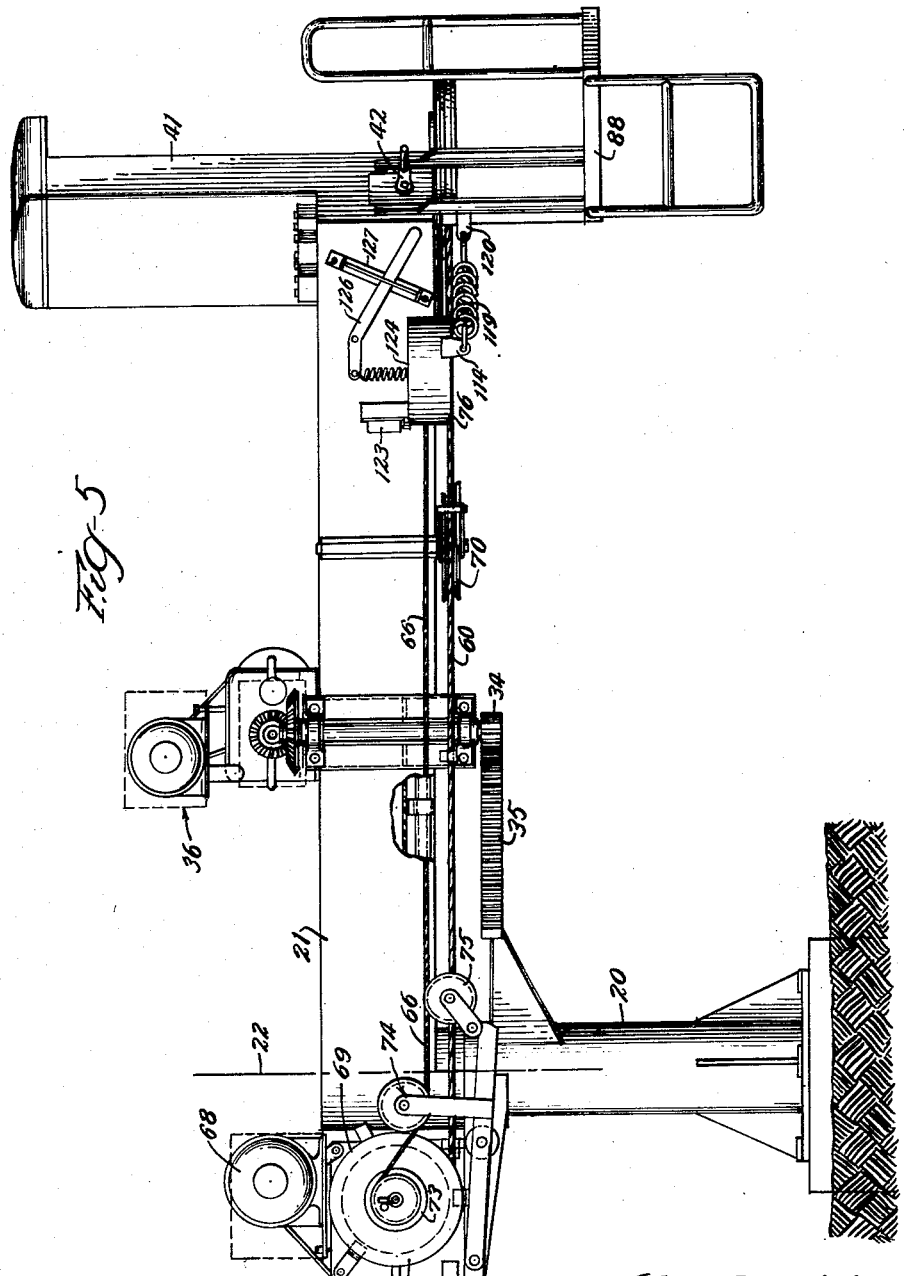

Dec. 7, 1954 A. D. SINDEN 2,696,312
APPARATUS FOR UNLOADING BULK MATERIAL FROM BOXCARS
Filed April 1, 1949 9 Sheets-Sheet 4
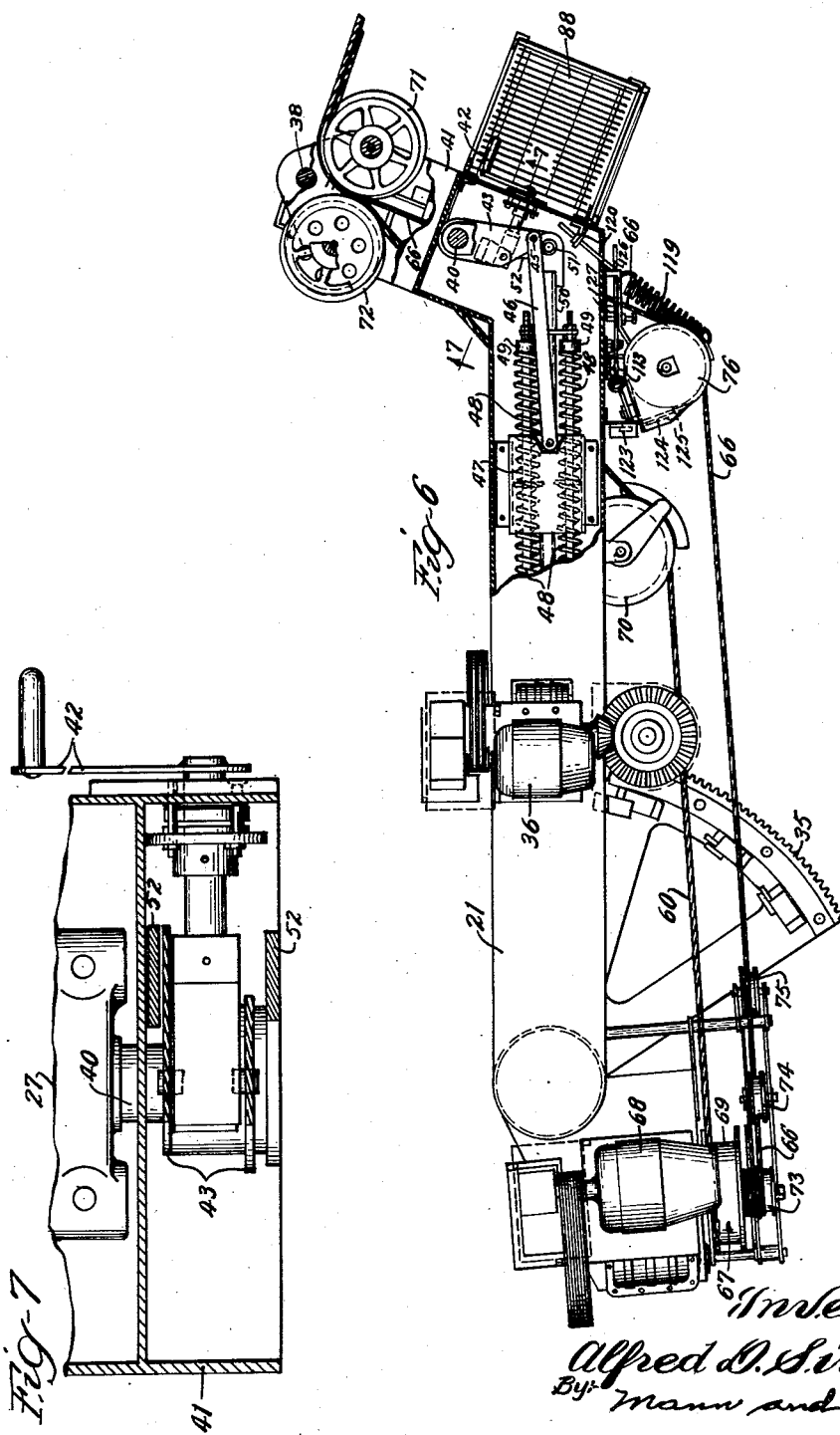
Inventor
Alfred D. Sinden
By: Mann and Brown
Attys.

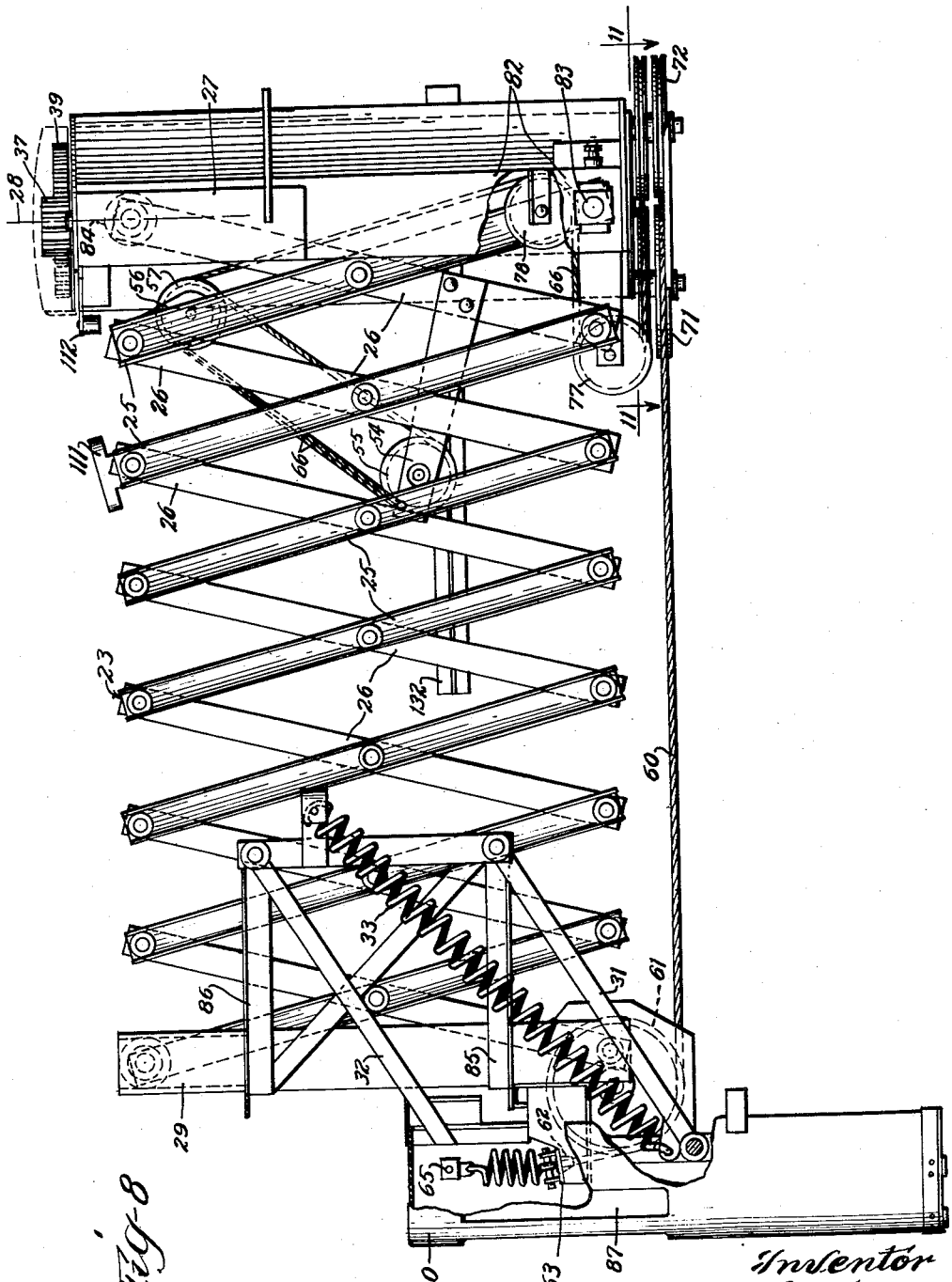

Dec. 7, 1954 A. D. SINDEN 2,696,312
APPARATUS FOR UNLOADING BULK MATERIAL FROM BOXCARS
Filed April 1, 1949 9 Sheets-Sheet 6
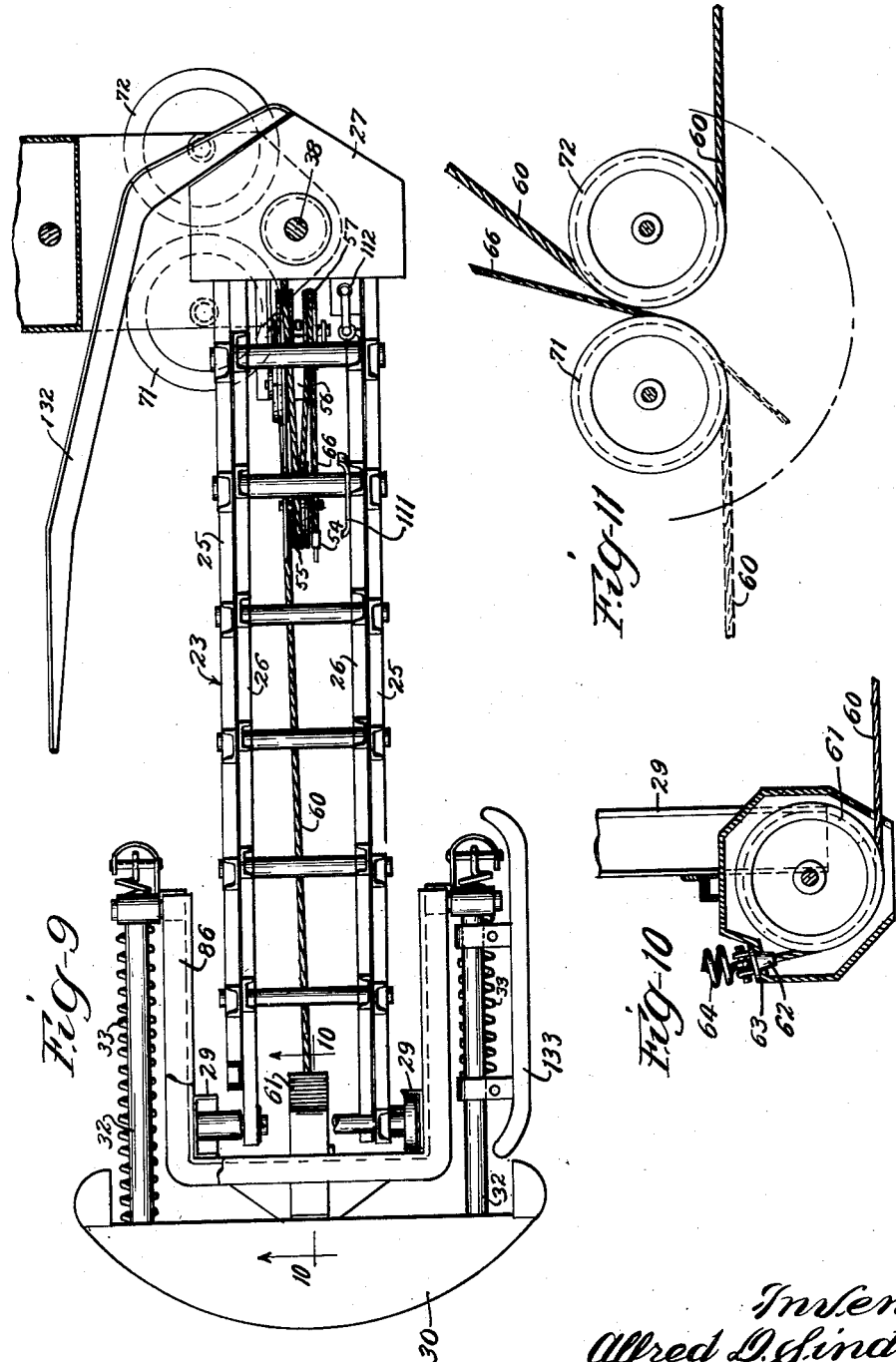

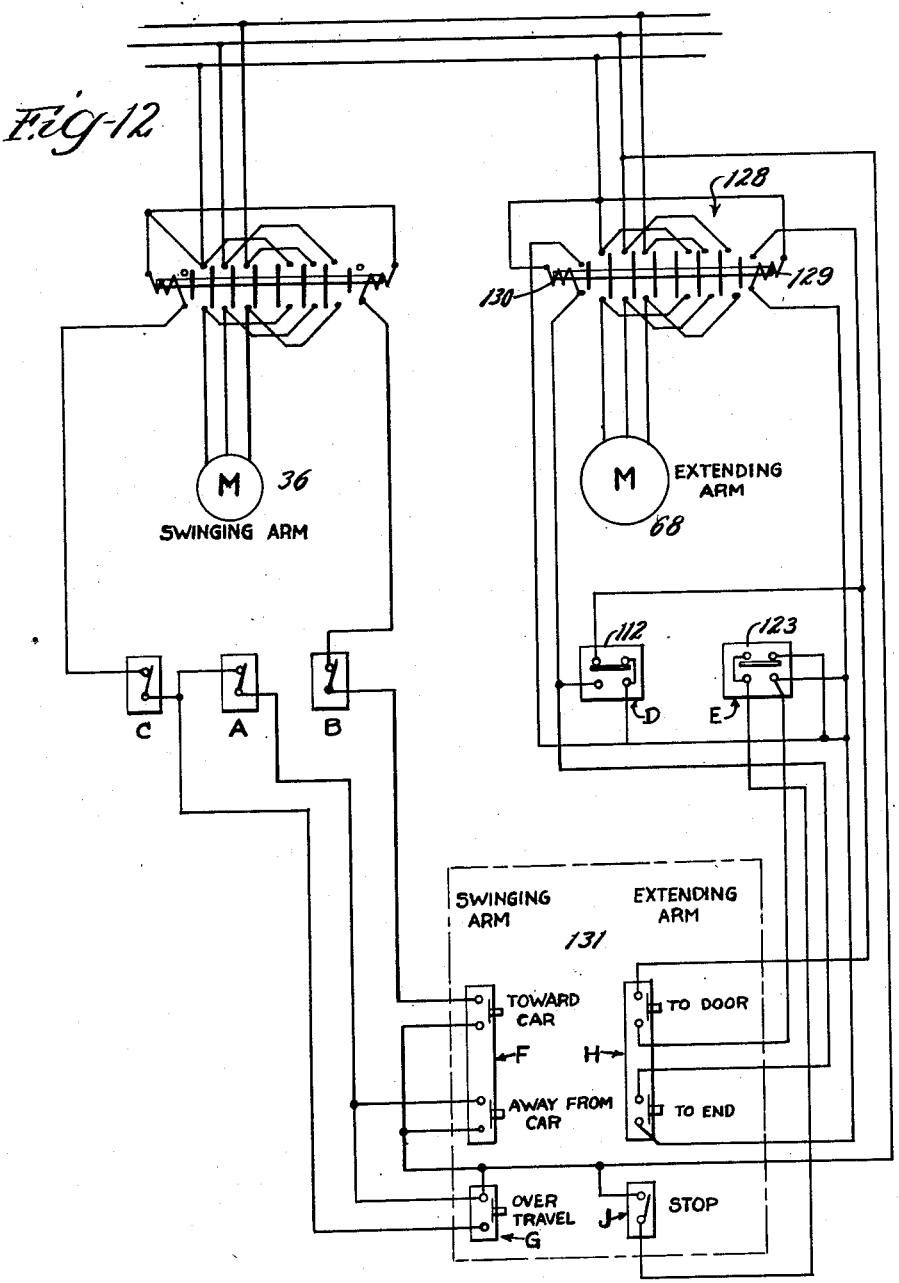

Dec. 7, 1954 A. D. SINDEN 2,696,312
APPARATUS FOR UNLOADING BULK MATERIAL FROM BOXCARS
Filed April 1, 1949 9 Sheets-Sheet 8
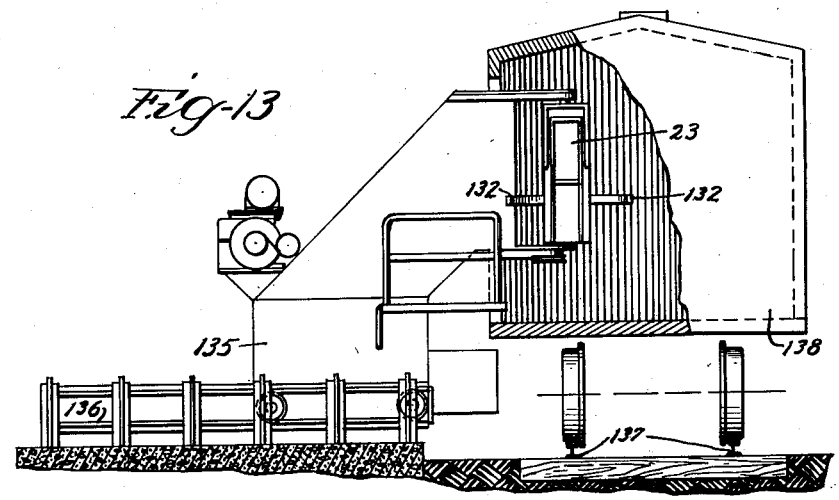
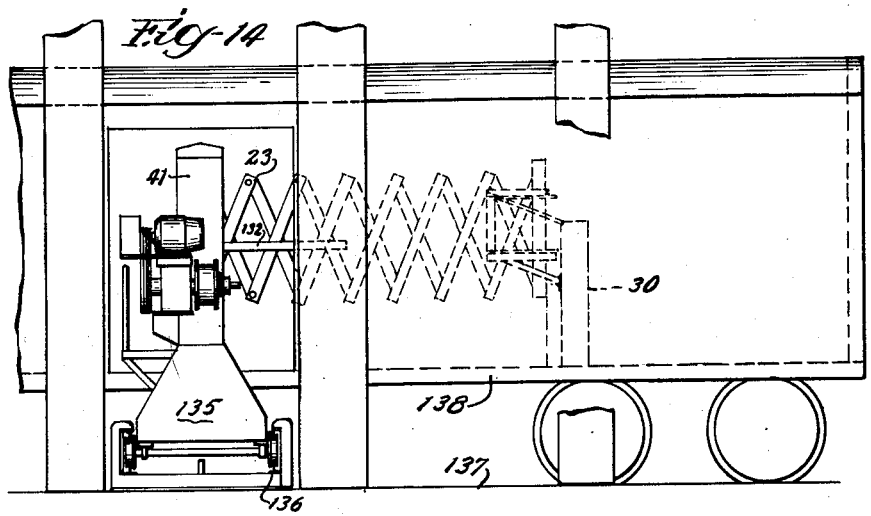
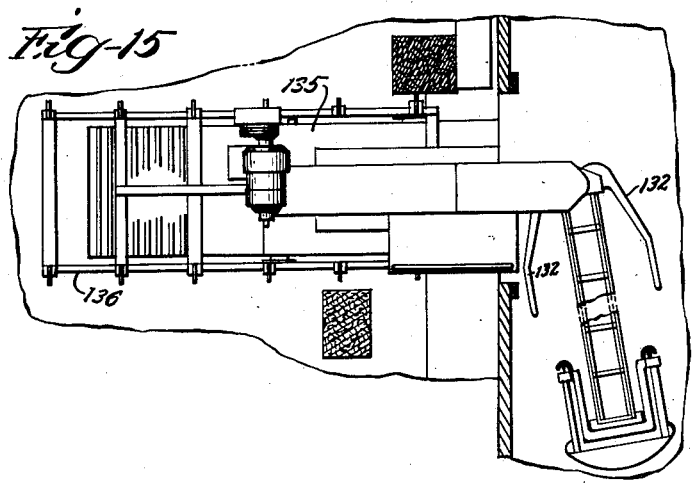
Inventor
Alfred D. Sinden
By:- Mann and Brown
Attys.

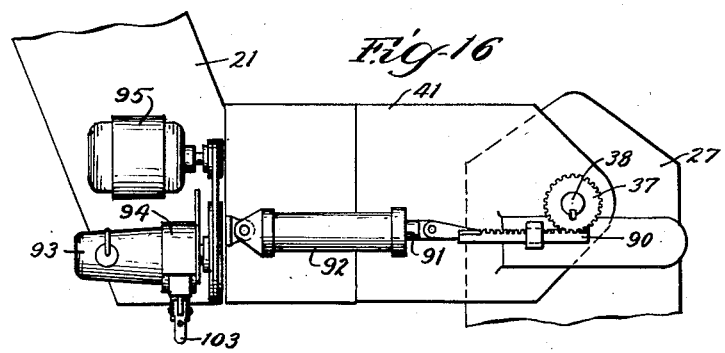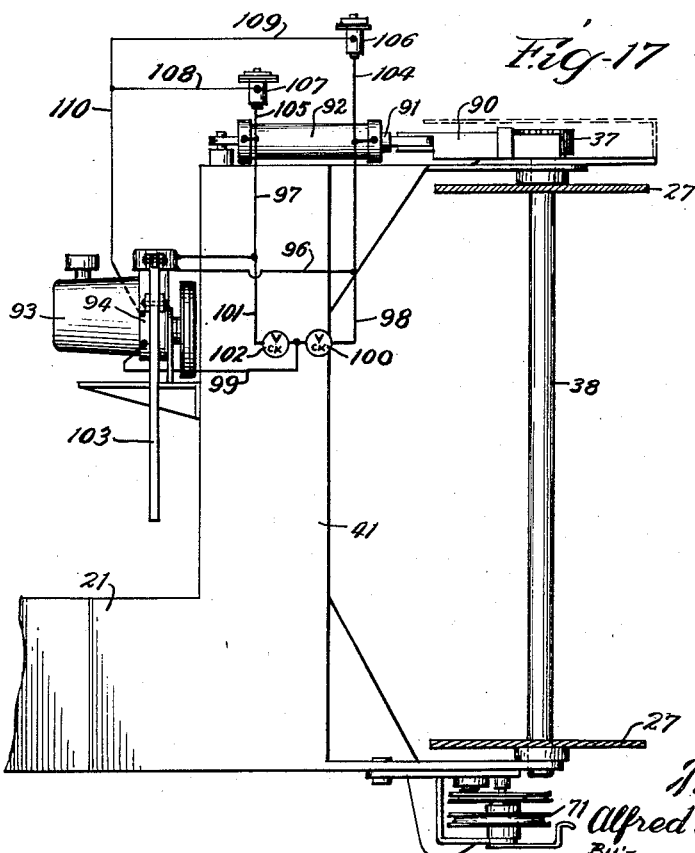

United States Patent Office 2,696,312
Patented Dec. 7, 1954

2,696,312

APPARATUS FOR UNLOADING BULK MATERIAL FROM BOXCARS

Alfred D. Sinden, Aurora, Ill., assignor to Stephens-Adamson Mfg. Co., a corporation of Illinois Application April 1, 1949, Serial No. 84,934

4 Claims. (Cl. 214—44)

The principal object of this invention is to provide apparatus that will enter a boxcar through a narrow door and will operate throughout the length and breadth of the car body to quickly and safely unload bulk material such as grain; that will afford the operator complete control of the apparatus at all times, and also provide for automatic cyclic operation when desired.

Generally speaking, this is accomplished by rigging a scoop or like drag tool for up and down movement on the free end of a light expansible and contractible boom (such as lazy tongs) rotatably mounted at its other end to let the operator direct the drag tool toward and away from any part of the car body with directional means prepared to yield to lateral forces or resistance, so that the tool may swerve appropriately, and may work along the wall of a car; and providing simple operating means that will put the boom and the tool through selected movements, automatically or otherwise, at the will of the operator, and will automatically change or reverse the movement when the tool or boom, in outward movement, reaches a set limit or meets with resistance that might otherwise cause damage.

In the drawings:

Fig. 1 is a plan view in diagram of the apparatus alongside a boxcar on a track, indicating the position of clearance and by dotted lines selected positions of entry into the car;

Fig. 2 is a similar diagram showing the apparatus in the car in position to operate toward either end or either side at any angle within the car, as indicated by several dotted lines;

Fig. 3 is a similar diagram showing the apparatus with the scoop at the right end of the car;

Fig. 4 is a diagram of the operating parts of the apparatus, framework and such visual obstructions being omitted;

Fig. 5 is a side elevation of the fixed base structure, the retractable support structure, or main arm, and the operating platform;

Fig. 6 is a plan view of the apparatus shown in Fig. 5;

Fig. 7 is a section taken on the line 7—7 of Fig. 6;

Fig. 8 is an enlarged side elevation of the contractible boom and scoop looking from the opposite side of Fig. 4;

Fig. 9 is a plan view of the apparatus shown in Fig. 8;

Fig. 10 is a section on the line 10—10 of Fig. 9;

Fig. 11 is a section on the line 11—11 of Fig. 8;

Fig. 12 is a wiring diagram;

Fig. 13 is an end elevation somewhat diagrammatically showing apparatus mounted on a track adjacent to railway track so as to be entered into the car by transverse movement with respect to the car door;

Fig. 14 is an elevation looking at the left of Fig. 13;

Fig. 15 is a plan view of the apparatus shown in Figs. 13 and 14;

Fig. 16 is a plan view of a modified form of means for swinging the boom; and

Fig. 17 is a diagrammatic side elevation of the same.

General arrangement

The general arrangement or general organization of the apparatus is shown in Figs. 4 and 5. As there shown, it includes a fixed base structure 20 upon which a retractable support structure or main arm 21 is mounted to rotate about a vertical axis 22. The otherwise free end of the main arm 21 forms a support for a longitudinally contractible boom generally indicated by 23 and comprising lazy tong links 25 and 26. The inner ends of the links 25 and 26 are associated with what may be called a base 27, which is mounted to rotate about a vertical axis 28. The outer end of the boom includes a front frame 29 forming a support for a scoop or like drag tool 30 mounted to swing on parallel links 31 and 32, and normally biased to an upper, ineffective position by springs 33.

By rotating the main arm 21 about the axis 22, the apparatus may be shifted from the position shown in Fig. 1 to that shown in Fig. 2, and vice versa. In short, it may be entered into a boxcar or withdrawn from it.

In this diagrammatic illustration, rotation of the main arm 21 about the axis 22 is effected by a pinion 34 on the main arm meshing with a gear sector 35 on the fixed base 20, and the pinion is shown as driven by a power mechanism generally indicated at 36 (Fig. 5).

By swinging the contractible boom 23 about the axis 28, the scoop 30 may be directed to any particular angular position for operating on the bulk material in the car in any way chosen by the operator. The dotted lines shown in Fig. 2 indicate a few of the great variety of positions that the scoop may be operated in by swinging the boom about that axis 28.

That swinging movement is effected by driving a pinion 37 on a shaft 38 fixed to the base 27 of the boom.

In this diagrammatic illustration, that is done by a gear sector 39 on a shaft 40 journalled in a forked end 41 of the main arm and operated by a crank 42.

In the particular mechanism shown in Figs. 4, 5, 6, etc., there is a yielding connection between the crank 42 and the shaft 40 to allow the boom to depart from the otherwise fixed direction in order to let it travel along the side wall of the car or the like without dangerous engagement. It forms a yielding directional means that at once protects the apparatus from injury and enables the operator to make the scoop travel along the side wall of the car in order to effectively remove the bulk material lying adjacent to it.

In this diagrammatic illustration (Fig. 4), the crank 42 operates an arm 43 fulcrumed at 44 on the main arm and pivoted at 45 to a link 46 equipped with a drag arm 47 between the adjacent ends of coil springs 48 between collars 49 on a rod 50 pivoted at 51 to an arm 52 on the shaft 40.

With such a yielding connection, it will be apparent that, notwithstand the relation between the sector 39 and the pinion 37, which gives the directional movement to the boom and the scoop, they are permitted to yield to either side by compressing either of the springs 48.

The boom is extended, and therefore the scoop moved outwardly by bringing corresponding ends of the lazy tong links 25 and 26 toward each other, or by bringing corresponding upper and lower pivots toward each other. As shown particularly in the diagram (Fig. 4), a link 26 is provided with an arm 54 equipped with a guide pulley 55; and an adjacent link 26 is provided with an arm 56 equipped with a guide pulley 57. By drawing those guide pulleys 55 and 57 together, the vertical height of the lazy tong boom is reduced, and its length is extended.

The boom is contracted by a pull on the outer end with a rope or cable, which at the same time, or as a part of the same operation, moves the scoop from its ineffective, upper position to its effective, lower position into the material to be unloaded.

As here shown, this is accomplished by a cable 60 having one end portion run around a guide sheave 61 at the outer end of the boom, and its end made fast to a plug 62 cooperating with bracket 63 on the front frame 29 of the boom. That plug is connected by a spring 64 with a scoop at 65. From this arrangement, it will be apparent that pulling on the cable 60 will first pull on the spring 64 and bring the scoop down against the resistance of the spring 33; and, when the plug 62 engages the bracket 63, the pull will haul the scoop toward the main arm, retracting the boom.

In the apparatus diagrammatically illustrated in the drawings, the cable 60 for retracting the boom, which may be called the main cable or in-haul cable, and the cable 66 for extending the boom, which may be called the auxiliary cable or out-haul cable, are wound on a double drum, generally indicated by 67, and driven by power mechanism 68 including a reversible motor.

The main cable 60 is wound on a large drum portion 69 of the drum 67, passes around the guide sheave 70 on the main arm, about other guide sheaves 71 and 72 at the bottom of the fork 41 of the main arm (Fig. 11), and thence to the guide sheave 61.

The auxiliary cable 66 is wound on a small drum portion 73 of the drum 67, passes through a slack take-up device 74, about guide sheaves 75 on the main arm, around a drum 76 adjacent to the fork of the main arm about guide pulleys like 71 and 72 (Figs. 6 and 11) and below them, and about guide pulleys 77 and 78, leading to the sheaves 55 and 57 on the links 25 and 26.

With this arrangement, it will be apparent that, while one cable winds on the drum, the other winds off. When the motor 68 is driving the drum 73 in one direction, the sheaves 55 and 57 will be drawn together, and the lazy tong boom will be extended. At the same time, the main cable will be drawn out. Upon reversing the rotation of the motor 68, the main cable will be wound onto the drum 69, and the auxiliary cable will be drawn off of the drum 73 while the boom is contracted.

From the foregoing, it will be apparent that the main arm can be swung to enter the apparatus into a car, the boom can be swung either way to direct the scoop along selected lines, the boom may be extended, the scoop lowered, the boom contracted, and the scoop drawn in to bring the bulk material toward the door of the car and deliver it into the hopper H (Figs. 1, 2, and 3) of conveyor apparatus for taking it wherever desired.

The fixed base structure

The fixed base structure includes a pedestal 20 equipped with the gear segment 35, the motor base is on arm 21, and bearings on which the arm is pivoted to swing about a substantially vertical axis under the control of the pinion 34 and the segment 35. The pedestal rests upon, and is secured to, any suitable foundation.

The retractable support structure

The retractable main arm 21 is a box-like section having at its free end a fork 41 turned at an angle to the main body of the arm 21, so that when the apparatus enters into the doorway of a box-car the fork will extend substantially at right angles to the length of the car, as shown in Figs. 2 and 3.

The contractible boom

The contractible boom is made up of a plurality of lazy tong links 25 and 26, the base 27, and the front frame 29. The base 27 includes an upright 82 to which the lower end of the adjacent links 25 is pivoted at 83, and which has a guide for rollers 84 on the upper ends of the adjacent links 26.

The front frame 29 is equipped with brackets 85 and 86 to which the parallel links 32 and 31 are pivoted and the biasing spring 33 is fastened. It also has guides and rollers corresponding to 82 and 84.

The construction of the scoop

The scoop for greatest delivery should be about as wide as can be gotten through the smallest car door with which the apparatus is to be used. In order that the lazy tong mechanism may be light, the scoop should be made of correspondingly light material. Aluminum has been found very satisfactory.

The shape of the scoop is of great importance, for its side portions should always tend to take in the bulk material adjacent to the line of travel rather than to fend off from the bulk material alongside the line of travel. The most satisfactory shape that has been found is substantially circular; and, for the mine run of cars, a circle on the radius of about 2'3" has been found satisfactory.

As shown in this diagrammatic illustration, the scoop 30 is provided with openings 87, which at once reduce the weight and provide easy observation of the material being handled through the scoop.

From the bottom of the openings upwardly, the scoop as shown really forms a column for the pivots 65 of the links 32.

Directional control of boom

While any sort of mechanism suited to the purpose may be used to swing the boom about the axis 28 and direct the scoop, the simple mechanism shown has been found satisfactory in practical operation, and is regarded as the best.

As shown in Figs. 5, 6, and 7, the crank 42 is convenient to the hand of the operator standing on the platform or control station 88, and he can swing the boom, as becomes expedient, in various positions into the car, making it operate on the lines indicated in Fig. 3 for example, or Fig. 2 for example, and a great variety of others.

The yielding connection shown in Fig. 4 is actually comprised of dual springs 48 (Fig. 6) in sets instead of the simple organization shown in the diagram.

Whether the boom is swung by hand power or some other, whether the yielding connection is made by springs or some other, are somewhat matters of choice and personal preference. The power arrangement that has been found satisfactory is shown in Figs. 16 and 17, based on a combination of hydraulics and mechanics.

In Figs. 16 and 17, pinion 37 is driven by a rack 90 operated by piston rod 91 of a piston in a hydraulic cylinder 92.

The hydraulic fluid is supplied from a reservoir 93 by pump 94 driven by a motor 95.

Fluid under pressure from the pump 94 is delivered to the right end of the cylinder 92 (Fig. 17) by a line 96, and to the left end of the cylinder 92 by a line 97. Return is by the same lines. Check valves 100 and 102 and lines 98, 99, and 101 account for the displacement of the piston rod 91.

From this, it is apparent that when the boom is to be swung in one direction pressure is introduced into the line 96; and, when in the other direction, pressure is introduced into the line 97. This is controlled by a valve mechanism operated by a lever 103. In one position of that lever, the pump merely circulates fluid through the reservoir. In a second position, it delivers fluid to the right end of the cylinder 92. In a third position, to the left end of the cylinder 92.

With such mechanism, it would be possible to swing the boom as desired; but, in moving the scoop along the wall of the car, there would be no yielding except the flexibility of the materials, and that is not sufficient for the best results.

To provide the yielding feature of the directional control by the mechanism shown in Figs. 16 and 17, additional lines 104 and 105 connecting with the opposite ends of the cylinder 92, and relief valves 106 and 107 connected by lines 108 and 109 to a common return 110, provide appropriate yield to the direction of control. The setting of the relief valves 106 and 107 will be so regulated with respect to the pressure required to control the boom that when the scoop meets lateral resistance, or laterally directed pressure, the relief valve will permit escape from the working end of the cylinder sufficient to protect the mechanism while holding the side of the scoop to its work with suitable pressure.

Cyclic operation

With the boom directed in a chosen position, the apparatus may be given a cyclic operation, repeated as long as desired while the boom is in that position or as it is moved to different positions. This is accomplished, in the main, by providing the boom 23 with a switch operating cam 111 to operate a limit switch or reversing switch 112 on the base 27 of the boom as the scoop reaches its extreme inward movement. That switch is in the circuit of the motor 68, and each time the scoop is brought to its innermost position the motor will be reversed—with the result that the boom will be immediately extended; the scoop will go out to the new position; and the direction of the motor will be reversed again, and the scoop will return. The provision for return, however, has some auxiliaries.

Outward movement of the scoop

The drum 76, about which the auxiliary cable 66 is wound (Fig. 4), is in a frame or casing, purposely omitted in the interest of clearness, mounted to swing about an axis 113 on links 114, only one of which is shown (again in the interest of clearness), and biased by a spring 119 connecting the frame or casing with a bracket 120 on the main arm 21. The frame or casing also carries a switch operating arm 122 to cooperate with a limit or reversing switch 123, also in the circuit of the motor 68.

Bearing in mind that the auxiliary cable 66 extends the contractible boom, it will be apparent that by adjusting the spring 119 in relation to the conditions, the motor 68 may be automatically reversed when the boom reaches its greatest length, and therefore the sheaves 55 and 57 are brought together, or the boom or the scoop meets with resistance or an obstruction that either makes it appropriate to bring the scoop down and return it for work, or to retract it to prevent damage to the mechanism.

With this and like arrangements, any resistance to the outward movement of the scoop or the boom of a selected magnitude will promptly effect a reversal of the motor 68 and a contraction of the boom and return to the scoop.

This mechanism with the cam 111 and limit switch 112 provides controlled cyclic operation.

Downward working pressure on the scoop

In the nature of things, if the scoop is to do its work it must travel along the floor of the car on the "in" movement, or movement toward the door. Also, in the nature of things, car floors are not smooth, and obstructions will be encountered. While the required pressure should be on the scoop to make it take all the bulk material off the floor, there should be yielding to that pressure to prevent damage. This is provided in part by the spring 64, which will allow the scoop to ride against the resistance of that spring even though the in-haul cable 60 is contracting the boom.

There is an auxiliary to this feature that is of importance.

The drum 76 is connected with a one-way brake 124 through an overrunning clutch 125, and the resistance of that brake is made adjustable by a lever 126 cooperating with a rack 127. By adjusting the friction of the brake 124 with relation to the springs 33, which normally hold the scoop in ineffective position, the in-haul cable 60 will first pull the scoop down to its effective position, and then begin the contracting of the boom.

When the auxiliary cable 66 is operating to extend the boom, tension is substantially uniform at each side on the drum 76. By referring to Fig. 6 and noting the relation of the two parts of the cable 66 with respect to the pivot 113 for the casing of the drum 76, it will be apparent that the resultant tends to swing the casing about the pivot 113 in a direction to operate the reversing switch 123.

However, on the opposite movement of the boom under the action of the cable 60, the auxiliary cable 66 is merely being payed out from the drum 67, the tension being in that portion of the cable at the right of the drum 76 in Fig. 4, with the result that there is no tendency to swing the casing of the drum 76 in a position to operate the switch 123. Hence, by adjusting the brake 124 and setting the overrunning clutch 125 in the right direction, the braking effect simply adds resistance to the cable 60, and hence adds a downward pull to the scoop to set it and hold it to its work, subject to the relieving action of the spring 64.

Wiring diagram

In the wiring diagram (Fig. 12), the limit switches or reversing switches 112 and 123 are shown connected with the motor 68 through a familiar solenoid operated switch 128 including solenoids 129 and 130. When the switch operating cam 111 strikes the limit switch 112, the solenoid 130 is energized to shift the switch 128 accordingly. When the operating arm 122 strikes the slimit switch 123, the solenoid 129 is energized to shift the switch in the opposite direction.

The control board 131 is provided with buttons marked "To Door," "To End," "Stop," providing the operator with controls indicated.

On the other side of the diagram is a similar arrangement for operating the motor of the mechanism 36 to swing the main arm as required.

In some applications, it will be preferable to have the mechanism travel into and out of the car instead of swinging it about the axis 22. Such an arrangement is shown in Figs. 13, 14, and 15, in which the apparatus is mounted upon a car 135 running on a track 136 arranged at right angles to the railway track 137 for the car 138. Otherwise, the apparatus shown there corresponds to that earlier described.

It has been found convenient to provide the apparatus with some fenders. For instance, in Fig. 9 there is a fender 132 fixed to the base of the contractible boom to fend against one side of the car door. At the lower left in Fig. 9, a fender 133 on the links 31 protects the scoop from the other side of the car door and the wall.

Similar fenders 132 are shown in Fig. 15.

One advantage of the present apparatus over all prior apparatus intended for the same purpose is that the scoop can be sent to each end of the car and brought from the end to the door. This means that there is very little of the lading left to be removed after the scooping work is done.

This is accomplished by the present machine by means of a brush 140 (Fig. 3) detachably mounted on the scoop, which can be used to sweep the floor of the car substantially clear of all the lading.

As will be apparent from the movements of the boom and the scoop, above described, the brush can be attached to the scoop and used to sweep one-half of the car; then the apparatus reversed; and the brush attached in another position to sweep the other half of the car.

The mode of attachment to the scoop is a matter of choice, but preferably clamps, illustrated diagrammatically in Fig. 3, are used.

Important distinguishing features

The contractible and expansible boom, including folding means by which the scoop may be taken to positions closely adjacent to the end wall of the car and brought back to positions close to the door of the car, is important in enabling the apparatus to substantially unload an entire car. That feature distinguishes from all prior apparatus for the purpose, both in the nearness with which it can take the scoop to the end of the car and also return it near enough to the door to substantially unload the material.

It is important that the scoop have side portions flaring or inclining outwardly to give them a tendency to bring the material into the scoop, or to feed the scoop into a pile of material or along the wall of the car rather than fend off from a pile of material or the material along the wall.

The yielding directional control of the boom, which permits it to urge the scoop in a rotational manner while being retracted, is important in enabling the apparatus to work along the side walls of the car. This feature distinguishes from all prior apparatus for the purpose.

The cyclic operation, with the automatic return determined by the resistance to outward movement, is important to the handling of the bulk material and the safety of the apparatus. Regardless of how the boom is extended, it is important to have outward resistance, either because the limit of extension is reached or because the scoop or boom strikes an obstruction, automatically terminate the outward movement before damage is done, and it is helpful to have the inward movement immediately follow.

Irrespective of the means used to take the scoop out or toward the material to be removed, the yielding or pressure sensitive means for ending that movement distinguishes from all prior devices for the purpose.

The means for insuring downward working pressure on the scoop, operating to make the scoop dig into the material to be unloaded and work close along the floor of the car, is essential to economical unloading. The yielding feature that enables the scoop to go over obstructions is important to prevent injury. Mounting the scoop on the end of the boom, with a natural bias to the up position overcome as a preliminary to return movement, gives the apparatus a natural digging and raking action.

Contracting the boom from the outer end makes it possible to use light, foldable means for extending and contracting the boom and burying the scoop while putting the major strain on the means for pulling the scoop toward the car door. Apparatus made according to this invention will permit the motor to be stalled on the return movement of the scoop without injuring the apparatus.

The braking means on the contraction of the boom, by which the pull on the cable is made to give the appropriate downward pressure on the scoop, is an important advantageous feature.

The means disclosed for performing these important functions and others is intended to be illustrative, and not necessarily limiting.

This application is a continuation in part of my application Ser. No. 636,359, for Material Handling Apparatus, filed December 21, 1945, and now abandoned.

I claim:

1. In a boxcar unloader for bulk material, a supporting structure, a horizontal arm pivoted to swing about a vertical axis thereon, a boom pivotally mounted on the free end of said arm and having a contractible member consisting of a plurality of links jointed together to form a generally horizontally extensible lazy tongs, a scoop mounted for up and down movement on the outer end of said boom and biased to its upper position, a line connected to certain of said links for pulling them together and thereby expanding the boom, another line operatively connected to the scoop, and means for successively pulling said lines toward said arm for first expanding the boom and then lowering the scoop and contracting the boom.

2. In a boxcar unloader for bulk material, a supporting structure, a horizontal arm pivoted to swing about a vertical axis thereon, a boom pivotally mounted on the free end of said arm and having a contractible member consisting of a plurality of links jointed together to form a generally horizontally extensible lazy tongs, yieldable means for swinging the boom about its pivotal connection to said arm, a scoop mounted for up and down movement on the outer end of said boom and biased to its upper position, a line connected to certain of said links for pulling them together and thereby expanding the boom, another line operatively connected to the scoop, and means for successively pulling said lines toward said arm for first expanding the boom and then lowering the scoop and contracting the boom.

3. In a boxcar unloader for bulk material, a supporting structure, a horizontal arm pivoted to swing about a vertical axis thereon and extend into a car through a side doorway thereof, an extensible and contractible boom pivotally mounted on the free end of said arm having a scoop on its free end adapted to move toward and from said arm as the boom is contracted and extended, and resilient means operatively connected with said boom and arm for yieldably biasing the scoop against the side wall of the car during contraction of the boom.

4. In a boxcar unloader for bulk material, a supporting structure, a horizontal arm pivoted to swing about a vertical axis thereon and extend into a car, an extensible and contractible boom pivotally mounted on the free end of said arm, flexible line means operative respectively for extending and contracting the boom, a reversible motor for operating said lines respectively, and a reversing switch operatively connected to the line for extending the boom for reversing said motor so as to operate the line for contracting the boom in response to predetermined resistance to extension.

References Cited in the file of this patent

UNITED STATES PATENTS

| Number | Name | Date |
| --- | --- | --- |
| 746,055 | Ferguson | Dec. 8, 1903 |
| 967,116 | Dupuis | Aug. 9, 1910 |
| 1,521,290 | Hague | Dec. 30, 1924 |
| 1,626,984 | Sundberg | May 3, 1927 |
| 1,780,578 | Christy | Nov. 4, 1930 |
| 2,237,141 | Gale | Apr. 1, 1941 |
| 2,272,958 | Wiese | Feb. 10, 1942 |
| 2,334,323 | Gilbert | Nov. 16, 1943 |
| 2,613,003 | Buck | Oct. 7, 1952 |